US012577088B2

(12) United States Patent
Schüler et al.

(10) Patent No.: US 12,577,088 B2
(45) Date of Patent: Mar. 17, 2026

(54) INDUSTRIAL TRUCK COMPRISING A LOAD FRAME

(71) Applicant: Jungheinrich Aktiengesellschaft, Hamburg (DE)

(72) Inventors: Michael Schüler, Wakendorf (DE); Helmut Lohmann, Nartum-Gyhum (DE); Holger Brunkhorst, Norderstedt (DE); Marcel Krenzin, Bramstedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 17/587,025

(22) Filed: Jan. 28, 2022

(65) Prior Publication Data

US 2022/0242711 A1 Aug. 4, 2022

(30) Foreign Application Priority Data

Jan. 29, 2021 (DE) ..................... 10 2021 102 061.1

(51) Int. Cl.

*B66F 9/12* (2006.01)
*B66F 9/075* (2006.01)
*B66F 9/08* (2006.01)
*B66F 9/20* (2006.01)

(52) U.S. Cl.

CPC ............ *B66F 9/12* (2013.01); *B66F 9/07531* (2013.01); *B66F 9/08* (2013.01); *B66F 9/205* (2013.01)

(58) Field of Classification Search

CPC ........................................................ B66F 9/12
See application file for complete search history.

(56) References Cited

U.S. PATENT DOCUMENTS

| | | | | | |
|---|---|---|---|---|---|
| 4,615,533 | A * | 10/1986 | Sewell | B62B 3/0618 280/43.23 |
| 9,908,762 | B1 * | 3/2018 | Hongpeng | B62B 3/0606 |
| 10,549,972 | B1 * | 2/2020 | Dunigan | B60L 50/66 |
| 10,787,351 | B2 * | 9/2020 | Lili | B62B 5/06 |
| 10,913,475 | B2 * | 2/2021 | Kalinowski | B62B 3/06 |
| 11,180,172 | B2 * | 11/2021 | Yahner | B66F 9/12 |
| 11,473,965 | B2 * | 10/2022 | Van Den Berg | G01G 19/083 |
| 2006/0245907 | A1 * | 11/2006 | Lee | B62B 3/0606 414/785 |
| 2017/0240194 | A1 | 8/2017 | Kalinowski et al. | |

(Continued)

FOREIGN PATENT DOCUMENTS

| | | | |
|---|---|---|---|
| DE | 19503979 | A1 | 8/1996 |
| DE | 19618246 | A1 | 10/1997 |
| DE | 102009056419 | A1 | 6/2011 |

(Continued)

OTHER PUBLICATIONS

DE 10 2021 102 061.1; German Search Report dated Oct. 22, 2021 (6 pages).

(Continued)

*Primary Examiner* — Mark C Hageman
(74) *Attorney, Agent, or Firm* — Barclay Damon LLP

(57) ABSTRACT

An industrial truck includes a drive part with a drive frame and a load part. The load part includes a lift frame having a load frame, which includes a plate, a load-carrying means connected to the plate, and at least one bearing head configured to receive a lift cylinder. The at least one bearing head is connected to the plate.

15 Claims, 2 Drawing Sheets

(56) References Cited

U.S. PATENT DOCUMENTS

2019/0351927 A1 * 11/2019 Yahner .................... B66F 9/082

FOREIGN PATENT DOCUMENTS

| | | | |
|---|---|---|---|
| DE | 102014113603 | A1 | 3/2016 |
| DE | 102019101864 | A1 | 8/2020 |
| EP | 1690823 | A2 | 8/2006 |

OTHER PUBLICATIONS

China National Intellectual Property Administration; Notification of First Office Action; Application No. 202210109862.2; Dated: Sep. 11, 2025; 14 pages.

* cited by examiner

INDUSTRIAL TRUCK COMPRISING A LOAD FRAME

CROSS REFERENCE TO RELATED APPLICATION

This application is based upon and claims priority to, under relevant sections of 35 U.S.C. § 119, German Patent Application No. 10 2021 102 061.1, filed Jan. 29, 2021, the entire contents of which is hereby incorporated by reference.

TECHNOLOGICAL FIELD

The following disclosure relates to an industrial truck comprising a load frame, in particular a low-lift or double stacker truck.

BACKGROUND

DE 10 2019 101 864 A1 discloses a lift truck having a drive part and a load part that is mounted on the drive part and that can be adjusted in height relative to the drive part by an initial lift. A drive frame of the drive part supports components of the lift truck. The load part comprises a load frame, which has wheel arms that extend out from the load frame along a vehicle longitudinal axis. The wheel arms each comprise a wheel at their free end in order to support the wheel arms and the vehicle. A battery supplying a drive of the lift truck is received in the drive frame, wherein the drive frame comprises a receiving space which is closed with respect to the load frame and in which components of the drive part are arranged, wherein the receiving space projects into the load frame and provides an upper limit for the initial lift of the load part. In the known design, the battery is received in the drive frame, which thus frees up space in the load frame for receiving components from the drive part.

DE 10 2011 015 936 A1 discloses an industrial truck comprising a closable battery compartment. The battery compartment constitutes a box-shaped component of the load frame on which the wheel arms are fastened and on which the lift cylinder acts.

In currently known industrial trucks, in particular in lift trucks and especially in low-lift and double stacker trucks, a typical basic design consists in the drive frame being designed to support the chassis and components. The box-shaped load frame serves as a battery holder and as a load carrier, and in double stacker trucks it also serves to support components of the lift frame. An important aspect of the known load frame is that it provides a stable component for the load part of the vehicle on account of its frame design with sparing use of materials and, at the same time, it also determines the driving dynamics with the weight of the battery.

BRIEF SUMMARY OF THE INVENTION

The object of the invention is to provide an industrial truck comprising a load frame that allows for a load frame that is as stable as possible with regard to weight and costs.

In an embodiment, the disclosed industrial truck is configured as a low-lift or double stacker truck. The industrial truck comprises a drive part having a drive frame and a load part having a lift frame. The lift frame comprises a load frame having a load-carrying means and a bearing head for a lift cylinder. In an embodiment, the load frame is raised above the bearing head. According to an embodiment, the load frame comprises a solid plate to which the bearing head and load-carrying means are attached. In an embodiment, the load frame is used without the previously typical battery box structure. As a result, the load frame is made significantly shorter in its dimensions. By using a solid plate that preferably has a predefined minimum thickness, the requirements with regard to weight, rigidity, and low costs can be met. For weight and stability reasons, the plate is preferably manufactured from metal, in particular steel.

In an embodiment of the industrial truck, a battery is provided for the vehicle in the drive part. The battery may be permanently installed in the industrial truck in the drive part thereof, for example connected to the drive frame, and remain in the vehicle even during charging procedures.

In an embodiment, the load-carrying means comprises a pair of wheel arms, each of which comprises at its free end a load roller for the initial lift that can be adjusted by means of a push/pull rod. The use of push/pull rods for the initial lift is well-known in the prior art. In general, the lifting movement of the lift cylinder is deflected to the push/pull rod of the load fork by means of a deflection lever, generally a three-point lever. For this purpose, a bearing block that is fastened to the plate is preferably provided for each of the wheel arms. The bearing block bears both the wheel arm and the deflection lever, by means of which the movement of the lift cylinder is deflected to the push/pull rod of the load fork. The load-carrying means may generally be any receiving means for a load and may, for example, also be formed of a pair of fork tines.

In an embodiment of the industrial truck, at least one reinforcing plate via which the bearing blocks and plate are connected to one another may be provided between the bearing blocks. In a preferred embodiment, the plate and the reinforcing plate are connected to one another via a butt joint, wherein the plate of the load frame stands perpendicularly on the reinforcing plate. The reinforcing plate may also be connected to the two wheel arms via a butt joint, for example. For this purpose, the reinforcing plate is arranged between the wheel arms and is connected thereto along its end by, for example, means of welding.

Furthermore, the bearing head for the lift cylinder comprises a rectangular base plate that is connected to the plate of the load frame in a planar manner. Preferably, the bearing head comprises a holder for the lift cylinder by means of which the force of the lift cylinder can be transferred to the load frame.

With regard to the predefined thickness of the plate, a thickness of 15 mm to 45 mm for a low-lift truck and 20 mm to 70 mm for a double stacker truck has proven particularly advantageous. These thicknesses provide the plate with sufficient weight and stability. Indeed, it is precisely because of these dimensions that no additional strengthening or reinforcing element is required in a region between the bearing head and the load-carrying means. It has also been shown that no additional strengthening or reinforcing element is needed on the plate at all. A particular advantage of the solid plate is that the lower weight with the use of lithium ion batteries can be compensated.

Furthermore, the at least one bearing head is preferably designed as an abutment for a lift cylinder, wherein multiple bearing heads may also be used if the vehicle is equipped with multiple lift cylinders.

BRIEF DESCRIPTION OF THE DRAWINGS

Two preferred embodiments of the invention will be explained in more detail below with reference to the figures, in which.

DETAILED DESCRIPTION OF THE INVENTION

Figure 1:
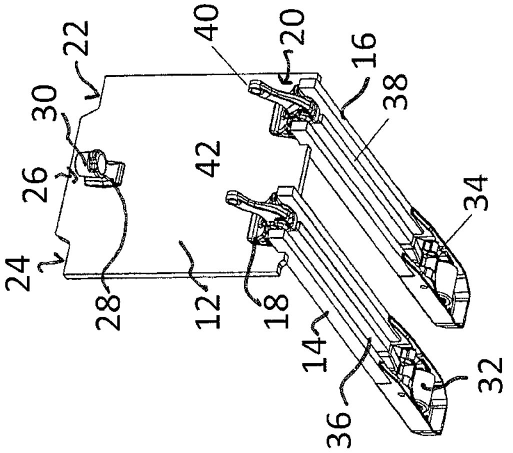
FIG. 1 illustrates a perspective view obliquely from below a load frame having two wheel arms attached thereto for a low-lift truck.

FIG. 1 shows a load frame 10, which has a solid plate 12 made of metal. The metal plate 12 is also referred to as a monoplate. The plate 12 has a substantially rectangular basic shape, wherein cutouts 18, 20 are provided in the region of the wheel arms 14, 16 and can partially receive the wheel arms 14 and 16 due to their shape and position. The plate 12 also comprises cutouts 22, 24 on the side opposite the wheel arms 14, 16, in the region of the corners.

A bearing head 26 is connected to the plate 12 in the center of the upper region. The bearing head 26 comprises a main body 28 connected to the plate 12 and a bearing holder 30 attached to said main body. The bearing holder 30 is configured to receive a lift cylinder (not shown) that is provided for raising and lowering the load frame, and is thus configured to raise the entire load frame. In a manner known per se, the wheel arms 14, 16 comprise load rollers 32, 34 that can be actuated by means of push/pull rods 36, 38 for an initial lift. The push/pull rods 36, 38 are actuated by respective three-point levers 42, 40. The free lever ends are for example hinged on the vehicle frame, such that, when the load frame is raised, the three-point lever 40, 42 pivots about a fixed pivot point on the load frame and actuates the push/pull rod 36, 38 with its third end.

Figure 2:
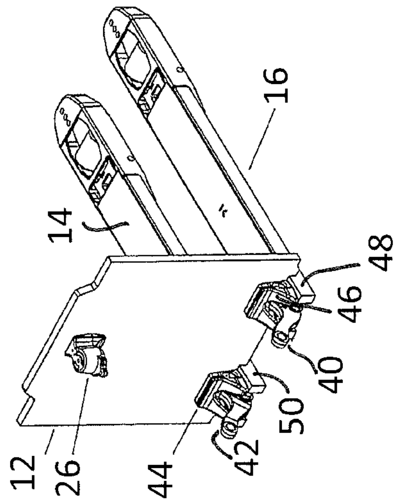
FIG. 2 illustrates a perspective view obliquely from above of the load frame from FIG. 1.

FIG. 2 shows a modified perspective view clearly showing the bearing blocks 44, 46 that support the connection of the wheel arms 14, 16 on the plate 12. The bearing blocks 44, 46 have a prism shape with a triangular cross-section. One leg of the bearing blocks 44, 46 rests on the plate 12 in a planar manner and the bearing blocks comprise a recess that leaves free space for the three-point lever 42, 40. On the end pointing away from the plate 12, the bearing blocks comprise the bearing point for the central bearing of the three-point lever 42, 40. One portion 48, 50 of the wheel arms 14, 16 projects beyond the plate 12, such that the bearing block can rest on the projecting portions 48, 50. The joining of the bearing plate and wheel arms and of the bearing block 44, 46 and wheel arms 14, 16 gives the connection sufficient stability.

In the invention, the plate 12 replaces the otherwise typical box structure in the load frame. Even in the case of very narrow batteries, the use of the plate 12 means a reduction in the length of the vehicle. The bearing blocks 44, 46, together with the plate 12, form a sufficiently long and stable connection for the wheel arms. In addition, the bearing blocks form a triangle on the plate together with the bearing head 26, which triangle ensures that the forces are introduced into the plate without the risk of deforming said plate. It is also clear that, in addition to the reduced vehicle length, the small number of components also reduces manufacturing costs and the amount of handling and joining work associated with a higher quantity of parts. Furthermore, as a solid metal component, the plate has a low vertical range of manufacture, which produces a good cost-to-weight ratio.

Another advantage of the design according to the invention is that high load capacities are possible, since there is a direct flow of force without the force having to be deflected and without joint connections having to be subjected to stress. In addition, the load frame presented is easily accessible, which also facilitates maintenance and servicing work.

Figure 4:
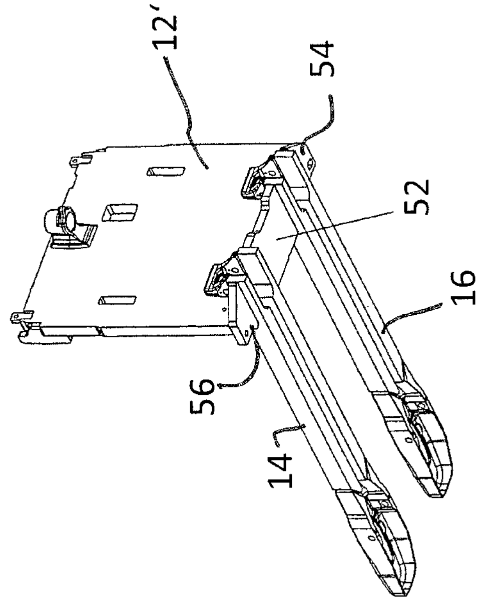
FIG. 4 illustrates a perspective view obliquely from below of the load frame from FIG. 3.
Figure 3:
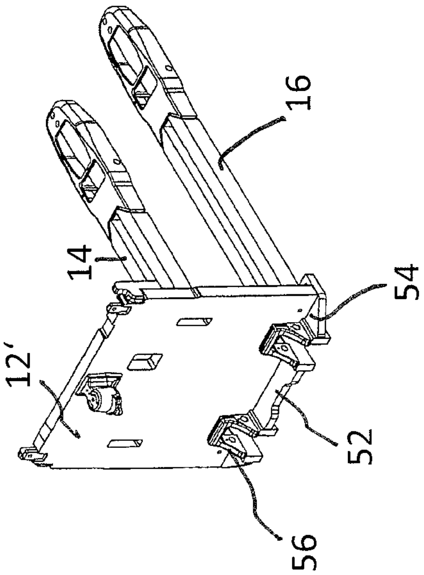
FIG. 3 illustrates a perspective view obliquely from above of a load frame having wheel arms and additional reinforcing plates.

FIGS. 3 and 4 show an embodiment of the load frame for raising larger loads of the like provided in a double stacker truck, for example. The plate 12' can clearly be seen to have a greater thickness than plate 12. Aside from the plate 12', other components in this exemplary embodiment have been assigned the same reference signs as in the first exemplary embodiment, even if they have different dimensions or if they have a different design, as in the region of the free ends of the wheel arms 14, 16.

The load frame from the exemplary embodiment in FIGS. 3 and 4 comprises reinforcing plates 52, 54, 56 that adjoin the plate 12' by a butt joint so as to form a T-shape. As shown by way of example in FIG. 4, the reinforcing plates extend on both sides of the plate 12' and provide a sufficiently long edge in the direction of the wheel arms 14, 16 for connection to side walls of the wheel arms 14, 16. The connection of the wheel arms takes place on three sides. Each wheel arm has a U-shaped profile, wherein the bearing blocks 44, 46 act on the leg of the U-profile that forms the base. In addition, the plate 12' may also be connected to this leg of the wheel arm. If a cutout is provided in the plate 12' for connecting the wheel arms 14, 16, said connection may also extend to the side legs of the wheel arms. The side legs of the wheel arms are also connected via the reinforcing plates 52, 54, 56. The reinforcing plates are also connected to the plate 12'. The additional reinforcing plates allow for the wheel arms to be connected in a sufficiently rigid manner and in a manner stable enough to lift larger loads.

LIST OF REFERENCE SIGNS

10 Load frame
12 Plate
12' Plate
14 Wheel arm
16 Wheel arm
18 Cutout
20 Cutout
22 Cutout
24 Cutout
26 Bearing head
28 Main body
30 Bearing holder
32 Load roller
34 Load roller
36 Push/pull rod
38 Push/pull rod
40 Three-point lever
42 Three-point lever
44 Bearing block
46 Bearing block
48 Portion
50 Portion
52 Reinforcing plate
54 Reinforcing plate
56 Reinforcing plate

The invention claimed is:

1. An industrial truck comprising:

a load part comprising a load frame, the load frame comprising, a plate, a load fork connected to the plate at a first end and extending from the plate to a free end, at least one bearing head connected to the plate and comprising, a bearing body coupled to the plate, and a bearing holder coupled to the bearing body configured to receive a lift cylinder that is configured to lift the load fork, two bearing blocks connected to the plate and each configured to support one of a pair wheel arms, and two push/pull rods, wherein each of the two push/pull rods is operatively coupled to a deflection lever, wherein each deflection levers is connected to the plate, wherein the plate extends along a vertical plane between the pair of wheel arms and the at least one bearing head, wherein the plate comprises a contiguous solid surface extending between the pair of wheel arms and from each of the pair of wheel arms to the at least one bearing head, and wherein a movement of the lift cylinder is deflected to each of the two push/pull rods.

2. The industrial truck according to claim 1, wherein each of the pair of wheel arms includes an attached end and an opposing free end, and wherein each of the pair of wheel arms comprises a load roller at the free end that is configured for an initial lift that can be adjusted by a push/pull rod.

3. The industrial truck according to claim 2, where in the plate is arranged in a region between the bearing head and the pair of wheel arms.

4. The industrial truck according to claim 1, further comprising at least one reinforcing plate configured to connect the at least one of the two bearing blocks and the plate are connected to one another.

5. The industrial truck according to claim 4, further comprising a butt joint positioned between the plate and the at least one reinforcing plate.

6. The industrial truck according to claim 1, wherein at least one reinforcing plate is connected to each of the pair of wheel arms, each of the two bearing blocks, and the plate.

7. The industrial truck according to claim 1, wherein the bearing head comprises a square base plate, and wherein the square base plate is connected to the plate of the load frame in a planar manner.

8. The industrial truck according to claim 1, wherein the at least one bearing head is configured as an abutment for the lift cylinder.

9. The industrial truck according to claim 1, wherein the at least one bearing head and the two bearing blocks are coupled to a same side of the plate.

10. The industrial truck according to claim 1, wherein the plate includes a surface that faces towards the free end and an opposing surface that faces away from the free end of the load fork, and wherein the at least one bearing head is positioned on the opposing surface of the plate.

11. The industrial truck according to claim 1, wherein the at least one bearing head is configured to be directly coupled to the plate.

12. The industrial truck according to claim 1, wherein the plate is manufactured as a single solid component and is comprised of a metal.

13. The industrial truck according to claim 12, wherein the load frame comprises a plate thickness of 15 to 45 mm.

14. The industrial truck according to claim 12, wherein the load frame comprises a plate thickness of 20 to 70 mm.

15. The industrial truck according to claim 1, wherein the plate extends between a base of the pair of wheel arms and the at least one bearing head.

* * * * *